(12) United States Patent
Akiyama et al.

(10) Patent No.: US 11,981,200 B2
(45) Date of Patent: May 14, 2024

(54) VEHICLE AND CONTROL DEVICE FOR VEHICLE

(71) Applicant: TOYOTA JIDOSHA KABUSHIKI KAISHA, Aichi-ken (JP)

(72) Inventors: Yosuke Akiyama, Susono (JP); Akira Ijichi, Odawara (JP); Taichi Kobayashi, Susono (JP); Koji Takaira, Okazaki (JP); Akinori Homan, Toyota (JP); Yoshio Itou, Susono (JP); Kunihiko Usui, Fuji (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 338 days.

(21) Appl. No.: 17/671,596

(22) Filed: Feb. 15, 2022

(65) Prior Publication Data

US 2022/0266689 A1 Aug. 25, 2022

(30) Foreign Application Priority Data

Feb. 19, 2021 (JP) ................... 2021-025722

(51) Int. Cl.
*B60K 23/08* (2006.01)
*B60K 17/344* (2006.01)
(Continued)

(52) U.S. Cl.
CPC ........ *B60K 23/0808* (2013.01); *B60K 17/344* (2013.01); *B60K 17/348* (2013.01); *B60W 20/00* (2013.01); *B60W 30/18172* (2013.01); *B60W 50/14* (2013.01); *B60K 6/52* (2013.01); *B60K 2023/085* (2013.01); *B60W 2510/087* (2013.01); *B60W 2520/26* (2013.01); *B60W 2552/15* (2020.02); *B60W 2720/40* (2013.01);
(Continued)

(58) Field of Classification Search
CPC .... B60K 6/52; B60K 17/348; B60K 23/0808; B60K 2023/085; B60W 20/00; B60W 30/18072; B60W 50/14; B60W 2552/15; B60W 2510/087; B60W 2520/26; B60W 2720/40; B60Y 2200/92; B60Y 2300/18175; B60Y 2400/82; F16H 48/06
See application file for complete search history.

(56) References Cited

U.S. PATENT DOCUMENTS

2008/0115997 A1\* 5/2008 Banno ................. H02K 11/25
180/242
2010/0041511 A1\* 2/2010 Tabata ............... F16H 61/0204
180/65.23
(Continued)

FOREIGN PATENT DOCUMENTS

WO 2010141682 A1 12/2010

*Primary Examiner* — Edwin A Young
(74) *Attorney, Agent, or Firm* — HAUPTMAN HAM, LLP (57) ABSTRACT

When temperature of a second power source of a vehicle becomes higher than a threshold value during a first mode in which three rotating elements of a differential gear can make differential movement and when four-wheel drive is needed, switching is performed to a second mode in which the three rotating elements are unified, and when four-wheel drive is not needed even when the temperature of the second power source becomes higher than the threshold value during the first mode, output of the second power source is restricted, while the first mode is maintained.

15 Claims, 5 Drawing Sheets

(51) Int. Cl.
    *B60K 17/348*     (2006.01)
    *B60W 20/00*     (2016.01)
    *B60W 30/18*     (2012.01)
    *B60W 50/14*     (2020.01)
    *B60K 6/52*     (2007.10)

(52) U.S. Cl.
    CPC . *B60Y 2200/92* (2013.01); *B60Y 2300/18175* (2013.01); *B60Y 2400/82* (2013.01)

(56) References Cited

U.S. PATENT DOCUMENTS

2013/0324342 A1* 12/2013 Onozaki .............. B60K 17/356
                                                          475/150
2017/0240163 A1* 8/2017 Suenaga ............... B60W 10/08

* cited by examiner

VEHICLE AND CONTROL DEVICE FOR VEHICLE

CROSS-REFERENCE TO RELATED APPLICATION

This application claims priority to Japanese Patent Application No. 2021-025722 filed on Feb. 19, 2021, incorporated herein by reference in its entirety.

BACKGROUND

1. Technical Field

The disclosure relates to a vehicle and a control device for a vehicle.

2. Description of Related Art

A transfer is known as a transmission system mounted on a vehicle. The transfer transmits motive power from an engine (first power source) in a distributional manner to front and rear wheels. An output side of the transfer is coupled to a front-wheel propeller shaft and a rear-wheel propeller shaft. The transfer can switch between a two-wheel-drive state, in which the motive power is output only to one of the propeller shafts, and a four-wheel-drive state, in which the motive power is output to both the propeller shafts.

WO 2010/141682 discloses that a transfer including a secondary power source (second power source) in a transfer case transmits motive power output from the second power source to front and rear wheels via a differential gear. In a configuration according to WO 2010/141682, the differential gear is caused to function as a transmission by fixing one rotating element, among three rotating elements included in the differential gear, to the transfer case, whereby rotation of the first power source, with speed of the rotation changed by the differential gear, can be transmitted to an output member.

SUMMARY

Incidentally, in the configuration according to WO 2010/141682, since the second power source is a motor, it is desired to restrain a rise in temperature of the motor. Accordingly, when the temperature of the motor is high, it is conceivable that output control of reducing output of the motor is performed in order to lower the temperature. However, when output of the motor is reduced in a four-wheel-drive state, driving force of the front wheels decreases, and it is therefore feared that four-wheel drive cannot be maintained.

The disclosure has been made in light of the above-described circumstances, and an object of the disclosure is to provide a vehicle and a control device for a vehicle that make it possible to generate driving force required by drive wheels, depending on a traveling state.

A vehicle according to the disclosure is a vehicle equipped with a transmission system, the transmission system including: a first input shaft to which motive power from a first power source is input; a second input shaft to which motive power from a second power source is input; a first output shaft that outputs the motive power to a first drive wheel; a second output shaft that outputs the motive power to a second drive wheel; a differential gear including, as three rotating elements, a first rotating element to which the second input shaft is coupled, a second rotating element to which the second output shaft is coupled, and a third rotating element to which the first output shaft is coupled; and an engagement device that selectively couples any two rotating elements of the three rotating elements, and the transmission system being capable of switching between a first mode in which the engagement device is released and the three rotating elements can make differential movement, and a second mode in which the engagement device is engaged and the three rotating elements are mechanically unified, wherein when temperature of the second power source becomes higher than a threshold value during the first mode and when both the first drive wheel and the second drive wheel need to be driven, switching is performed from the first mode to the second mode, and when the first drive wheel and the second drive wheel do not both need to be driven even when the temperature of the second power source becomes higher than the threshold value during the first mode, output of the second power source is restricted, while the first mode is maintained.

According to such a configuration, when the temperature of the second power source becomes higher than the threshold value during the first mode, control can be separately performed such as to shift to the second mode and such as to restrict output of the second power source while the first mode is maintained, in a case where both the first drive wheel and the second drive wheel need to be driven, and in a case where not both need to be driven, respectively. Thus, driving force required by the drive wheels can be generated, depending on a traveling state of the vehicle.

When required driving force is larger than a predetermined value, it may be determined that both the first drive wheel and the second drive wheel need to be driven, and when the required driving force is equal to or smaller than the predetermined value, it may be determined that the first drive wheel and the second drive wheel do not both need to be driven.

According to such a configuration, driving force required by the drive wheels can be generated, according to the required driving force.

When vehicle speed is lower than a predetermined vehicle speed, it may be determined that both the first drive wheel and the second drive wheel need to be driven, and when the vehicle speed is equal to or higher than the predetermined vehicle speed, it may be determined that the first drive wheel and the second drive wheel do not both need to be driven.

According to such a configuration, driving force required by the drive wheels can be generated, according to the vehicle speed.

When a road surface gradient during hill climbing is larger than a predetermined value, it may be determined that both the first drive wheel and the second drive wheel need to be driven, and when the road surface gradient is equal to or smaller than the predetermined value, it may be determined that the first drive wheel and the second drive wheel do not both need to be driven.

According to such a configuration, driving force required by the drive wheels can be generated, according to the road surface gradient during hill climbing.

When slippage of the first drive wheel occurs, it may be determined that both the first drive wheel and the second drive wheel need to be driven, and when no slippage of the first drive wheel occurs, it may be determined that the first drive wheel and the second drive wheel do not both need to be driven.

According to such a configuration, driving force required by the second drive wheel can be generated when slippage of the first drive wheel occurs.

When a switch for switching to a drive mode in which both the first drive wheel and the second drive wheel are driven is operated by a driver, it may be determined that both the first drive wheel and the second drive wheel need to be driven, and when the switch is not operated, it may be determined that the first drive wheel and the second drive wheel do not both need to be driven.

According to such a configuration, driving force required by the drive wheels can be generated, depending on whether or not the switch for switching drive modes is operated by the driver.

When the temperature of the second power source becomes higher than the threshold value during the first mode, a warning may be given to prompt a driver to lower the temperature of the second power source, and when the temperature of the second power source does not tend downward after the warning is given, it may be determined whether or not both the first drive wheel and the second drive wheel need to be driven.

According to such a configuration, a warning can be given to the driver in advance, so that frequency of mode shifts can be reduced.

A control device for a vehicle according to the disclosure is a control device for a vehicle equipped with a transmission system, the transmission system including: a first input shaft to which motive power from a first power source is input; a second input shaft to which motive power from a second power source is input; a first output shaft that outputs the motive power to a first drive wheel; a second output shaft that outputs the motive power to a second drive wheel; a differential gear including, as three rotating elements, a first rotating element to which the second input shaft is coupled, a second rotating element to which the second output shaft is coupled, and a third rotating element to which the first output shaft is coupled; and an engagement device that selectively couples any two rotating elements of the three rotating elements, and the transmission system being capable of switching between a first mode in which the engagement device is released and the three rotating elements can make differential movement, and a second mode in which the engagement device is engaged and the three rotating elements are mechanically unified, the control device including a control section that switches a state of the differential gear from the first mode to the second mode when temperature of the second power source becomes higher than a threshold value during the first mode and when both the first drive wheel and the second drive wheel need to be driven, wherein when the first drive wheel and the second drive wheel do not both need to be driven even when the temperature of the second power source becomes higher than the threshold value during the first mode, the control section restricts output of the second power source, while maintaining the first mode.

According to such a configuration, when the temperature of the second power source becomes higher than the threshold value during the first mode, control can be separately performed such as to shift to the second mode and such as to restrict output of the second power source while the first mode is maintained, in a case where both the first drive wheel and the second drive wheel need to be driven, and in a case where not both need to be driven, respectively. Thus, driving force required by the drive wheels can be generated, depending on a traveling state of the vehicle.

A determination section may be further included that determines whether or not both the first drive wheel and the second drive wheel need to be driven.

According to such a configuration, it can be determined that the traveling state is a state in which both the first drive wheel and the second drive wheel need to be driven.

The determination section may determine that both the first drive wheel and the second drive wheel need to be driven when required driving force is larger than a predetermined value, and may determine that the first drive wheel and the second drive wheel do not both need to be driven when the required driving force is equal to or smaller than the predetermined value.

According to such a configuration, driving force according to the required driving force can be generated by the drive wheels, based on a result of the determination by the determination section.

The determination section may determine that both the first drive wheel and the second drive wheel need to be driven when vehicle speed is lower than a predetermined vehicle speed, and may determine that the first drive wheel and the second drive wheel do not both need to be driven when the vehicle speed is equal to or higher than the predetermined vehicle speed.

According to such a configuration, driving force according to the vehicle speed can be generated by the drive wheels, based on a result of the determination by the determination section.

The determination section may determine that both the first drive wheel and the second drive wheel need to be driven when a road surface gradient during hill climbing is larger than a predetermined value, and may determine that the first drive wheel and the second drive wheel do not both need to be driven when the road surface gradient is equal to or smaller than the predetermined value.

According to such a configuration, driving force according to the road surface gradient during hill climbing can be generated by the drive wheels, based on a result of the determination by the determination section.

The determination section may determine that both the first drive wheel and the second drive wheel need to be driven when slippage of the first drive wheel occurs, and may determine that the first drive wheel and the second drive wheel do not both need to be driven when no slippage of the first drive wheel occurs.

According to such a configuration, driving force required by the second drive wheel can be generated when slippage of the first drive wheel occurs.

The determination section may determine that both the first drive wheel and the second drive wheel need to be driven when a switch for switching to a drive mode in which both the first drive wheel and the second drive wheel are driven is operated by a driver, and may determine that the first drive wheel and the second drive wheel do not both need to be driven when the switch is not operated.

According to such a configuration, driving force required by the drive wheels can be generated, depending on whether or not the switch for switching drive modes is operated by the driver.

When the temperature of the second power source becomes higher than the threshold value during the first mode, the control section may give a warning to prompt a driver to lower the temperature of the second power source, and when the temperature of the second power source does not tend downward after the warning is given, the determination section may determine whether or not both the first drive wheel and the second drive wheel need to be driven.

According to such a configuration, a warning can be given to the driver in advance, so that frequency of mode shifts can be reduced.

In the disclosure, when the temperature of the second power source becomes higher than the threshold value during the first mode, control can be separately performed such as to shift to the second mode and such as to restrict output of the second power source while the first mode is maintained, in a case where both the first drive wheel and the second drive wheel need to be driven, and in a case where not both need to be driven, respectively. Thus, it is possible to generate driving force required by the drive wheels, depending on a traveling state of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a vehicle and a control device for a vehicle according to an embodiment of the disclosure will be described specifically with reference to the drawings. Note that the disclosure is not limited to the embodiment described below.

Figure 1:
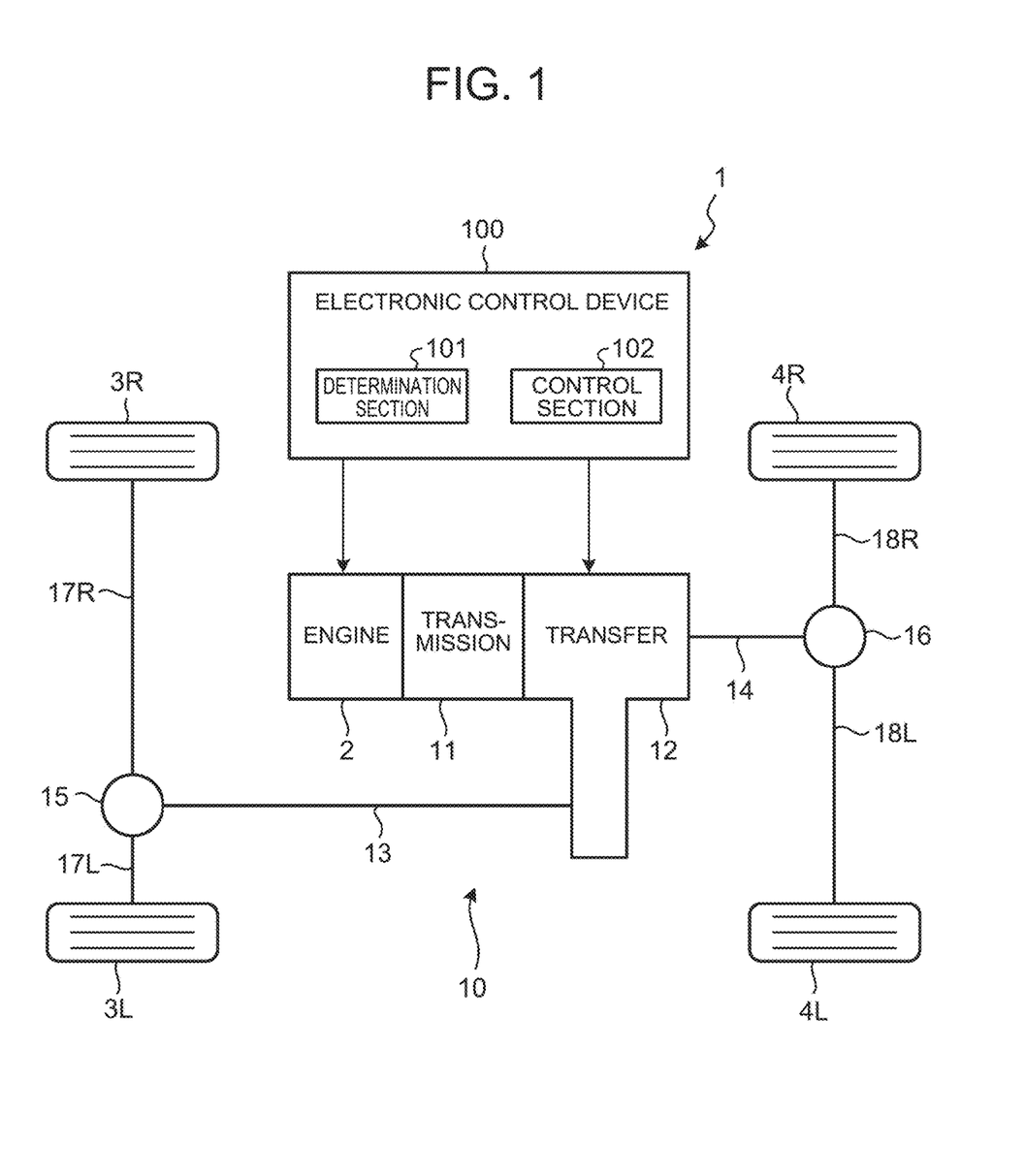
FIG. 1 is a skeleton diagram schematically showing a vehicle according to an embodiment.

FIG. 1 is a skeleton diagram schematically showing the vehicle according to the embodiment. The vehicle 1 includes an engine 2 as a power source, left and right front wheels 3L, 3R, left and right rear wheels 4L, 4R, and a transmission system 10 that transmits motive power of the engine 2 to the front wheels 3 and the rear wheels 4 individually. The vehicle 1 is a four-wheel-drive vehicle based on a front-engine, rear-wheel-drive layout. The rear wheels 4 are main drive wheels that serve as drive wheels during both two-wheel-drive traveling and four-wheel-drive traveling. On the other hand, the front wheels 3 are secondary drive wheels that serve as idler wheels during two-wheel-drive traveling, and serve as drive wheels during four-wheel-drive traveling. In the present embodiment, the engine 2 is "first power source", the rear wheels 4 are "first drive wheel", and the front wheels 3 are "second drive wheel".

The transmission system 10 includes a transmission 11 coupled to the engine 2, a transfer 12 that is a front-and-rear-wheels motive power distribution device coupled to the transmission 11, a front propeller shaft 13 and a rear propeller shaft 14 each coupled to the transfer 12, a front-wheel differential gear mechanism 15 coupled to the front propeller shaft 13, a rear-wheel differential gear mechanism 16 coupled to the rear propeller shaft 14, left and right front-wheel axles 17L, 17R coupled to the front-wheel differential gear mechanism 15, and left and right rear-wheel axles 18L, 18R coupled to the rear-wheel differential gear mechanism 16. Note that the wheels and the axles are expressed as the front wheels 3, the rear wheels 4, the front-wheel axles 17, and the rear-wheel axles 18b by omitting the signs "L", "R" when left and right are not particularly distinguished.

Motive power output from the engine 2 is transmitted to the transfer 12 via the transmission 11. The motive power transmitted to the transfer 12 is transmitted from the transfer 12 to the rear wheels 4, through a rear-wheel-side motive power transmission path sequentially via the rear propeller shaft 14, the rear-wheel differential gear mechanism 16, and the rear-wheel axles 18. Part of the motive power to be transmitted to a rear wheels 4 side is distributed by the transfer 12 to a front wheels 3 side, and is transmitted to the front wheels 3 through a front-wheel-side motive power transmission path sequentially via the front propeller shaft 13, the front-wheel differential gear mechanism 15, and the front-wheel axles 17.

Moreover, the vehicle 1 includes an electronic control device 100 that controls the vehicle 1. The electronic control device 100 is a control device for the vehicle 1. For example, the electronic control device 100 includes a microcomputer including a CPU, a RAM, a ROM, an input-output interface, and the like. The CPU executes various control of the vehicle 1 by performing signal processing in accordance with a program stored in advance in the ROM, while using a transitory storage function of the RAM. The electronic control device 100 includes a determination section 101 and a control section 102.

The electronic control device 100 receives, as inputs, signals from various sensors mounted on the vehicle 1. For example, sensor signals from an engine speed sensor, a motor rotation angle sensor, a vehicle speed sensor, an accelerator operation amount sensor, a 4WD selection switch for selecting a four-wheel-drive state based on operation by a driver, a gradient sensor, a wheel speed sensor, and the like are input into the electronic control device 100. The electronic control device 100 executes drive control and the like on the vehicle 1, based on the input sensor signals. For example, the determination section 101 determines a traveling state of the vehicle 1, based on the input signals from the various sensors. The control section 102 then controls an operation mode of the vehicle 1, depending on a result of the determination by the determination section 101. At the time, the electronic control device 100 outputs a command signal for controlling the engine 2, a command signal for controlling the transmission 11, a command signal for controlling the transfer 12, and the like.

Figure 2:
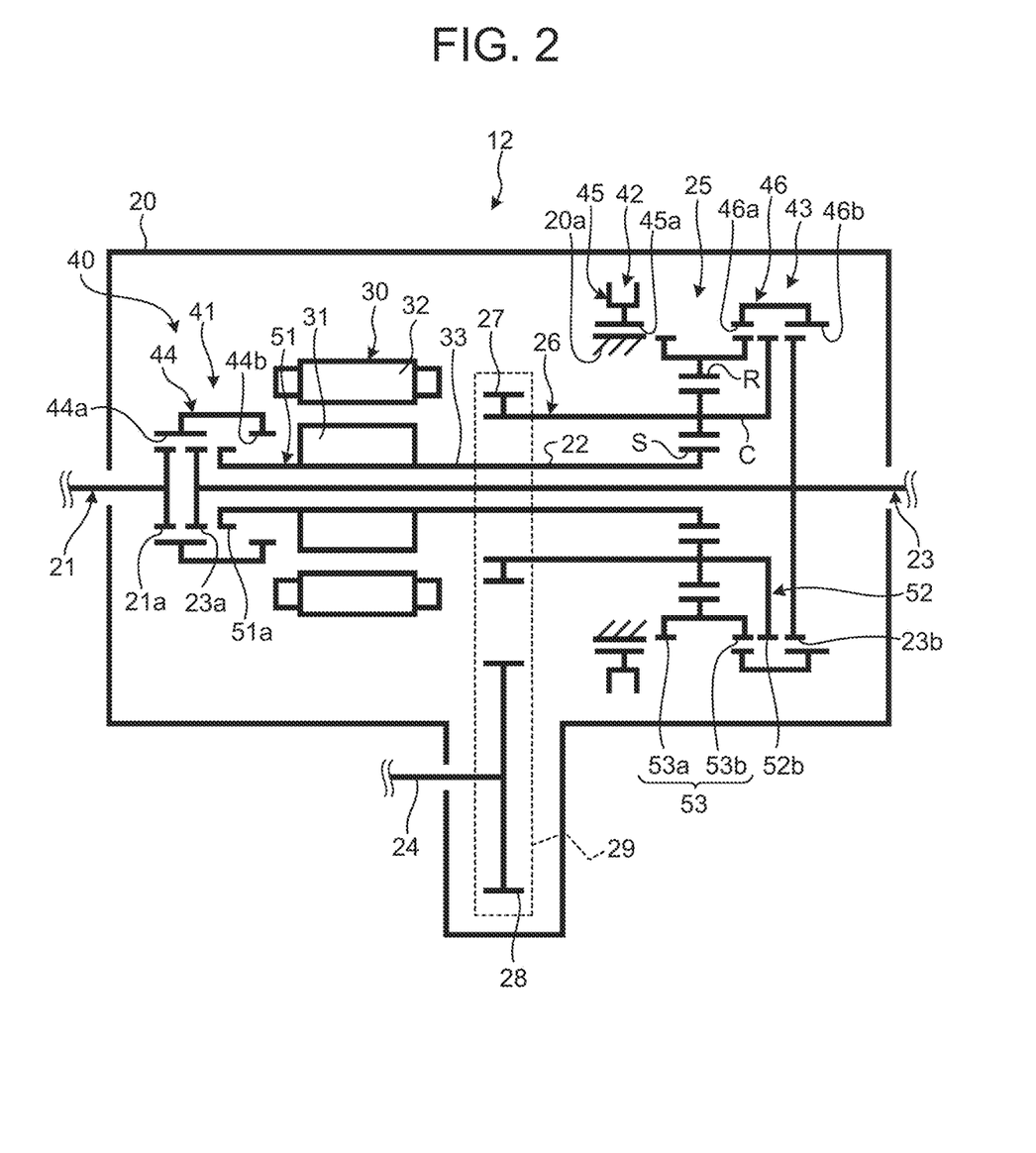
FIG. 2 is a skeleton diagram schematically showing a configuration of a transfer in the embodiment.

FIG. 2 is a skeleton diagram schematically showing a configuration of the transfer in the embodiment. The transfer 12 includes a transfer case 20 that is a non-rotating member. In the transfer case 20, the transfer 12 includes a first input shaft 21, a second input shaft 22, a rear-wheel-side output shaft 23, a front-wheel-side output shaft 24, and a planetary gear system 25. Moreover, in the transfer case 20, the transfer 12 includes, as rotating members that form the front-wheel-side motive power transmission path, a transmission portion 26 that functions as an input portion into the front-wheel side, a driving gear 27 that outputs the motive power to the front-wheel-side output shaft 24, a driven gear 28 provided on the front-wheel-side output shaft 24 in a unified manner, and a front-wheel drive chain 29 that couples the driving gear 27 and the driven gear 28. Further, in the transfer case 20, the transfer 12 includes a motor 30 that functions as a second power source, and an engagement device 40 that switches connection states of the rotating members. In the present embodiment, the rear-wheel-side output shaft 23 is "first output shaft", the front-wheel-side output shaft 24 is "second output shaft", the planetary gear system 25 is "differential gear", and the motor 30 is "second power source".

The first input shaft 21 is an input member that inputs motive power from the engine 2 into the transfer 12. The motive power from the engine 2 is transmitted to the first input shaft 21 via the transmission 11. For example, the first input shaft 21 is splined to an output member of the transmission 11.

The second input shaft 22 is an input member that inputs motive power from the motor 30 into the planetary gear system 25. The motive power from the motor 30 is directly transmitted to the second input shaft 22. For example, the second input shaft 22 is splined to an output member (rotor shaft 33) of the motor 30, and rotates in unison with the rotor shaft 33.

The rear-wheel-side output shaft 23 is an output member that outputs the motive power from the transfer 12 to the rear wheels 4. The rear-wheel-side output shaft 23 is a main drive shaft arranged on the same axis as the first input shaft 21 and coupled to the rear propeller shaft 14.

The front-wheel-side output shaft 24 is an output member that outputs the motive power from the transfer 12 to the front wheels 3. The front-wheel-side output shaft 24 is a secondary drive shaft arranged on a different axis from the axis of the first input shaft 21 and the rear-wheel-side output shaft 23 and coupled to the front propeller shaft 13. The front-wheel-side output shaft 24 is caused to rotate by rotation of the driving gear 27. The driving gear 27 is coupled to the transmission portion 26 in such a manner as to rotate in unison with the transmission portion 26.

The transmission portion 26 is a rotating member that transmits the motive power to the front-wheel-side output shaft 24. To the transmission portion 26, the driving gear 27 is coupled in such a manner as to rotate in unison with the transmission portion 26. The driving gear 27 is a rotating member that functions as an output portion to the front-wheel side, and is an output gear that transmits the motive power to the front-wheel-side output shaft 24. The transmission portion 26 and the driving gear 27 are rotatably arranged relative to the rear-wheel-side output shaft 23. In the transfer 12, the driving gear 27, the transmission portion 26, and the planetary gear system 25 are aligned in an axial direction, each with the same rotation center as the rear-wheel-side output shaft 23.

The planetary gear system 25 is a differential gear including three rotating elements, and functions as a motive power split mechanism that splits the motive power from a power source between the front wheels 3 and the rear wheels 4. The planetary gear system 25 is also a gear portion that changes speed of rotation from the engine 2 and outputs the rotation with the changed speed. The planetary gear system 25 illustrated in FIG. 2 is a single-pinion planetary gear system. The planetary gear system 25 includes, as the three rotating elements, a sun gear S, a carrier C that rotatably and revolvably supports a plurality of pinion gears, and a ring gear R that meshes with the sun gear S via the pinion gears. In the present embodiment, the sun gear S is "first rotating element", the carrier C is "second rotating element", and the ring gear R is "third rotating element".

The second input shaft 22 and a first rotating member 51 are coupled to the sun gear S in such a manner as to rotate in unison with the sun gear S. In other words, the motor 30 is always connected to the sun gear S. The first rotating member 51 is a member that rotates in unison with the sun gear S, and includes input gear teeth 51a. The first rotating member 51 is coupled to the sun gear S via the second input shaft 22. A rotating member on an engine 2 side is selectively coupled to the input gear teeth 51a by the engagement device 40.

A second rotating member 52 and the transmission portion 26 are coupled to the carrier C in such a manner as to rotate in unison with the carrier C. The second rotating member 52 is a member that rotates in unison with the carrier C, and includes first output gear teeth 52a and second output gear teeth 52b. The other end of connection with the carrier C is selectively switched by the engagement device 40.

A third rotating member 53 is coupled to the ring gear R in such a manner as to rotate in unison with the ring gear R. The third rotating member 53 is a member that rotates in unison with the ring gear R, and includes first output gear teeth 53a and second output gear teeth 53b. The other end of connection with the ring gear R is selectively switched by the engagement device 40.

The motor 30 is a rotating electric machine (motor-generator) that is capable of functioning as an electric motor and an electric power generator. The motor 30 is electrically connected to a battery via an inverter. The motor 30 is arranged on the same axis as the rear-wheel-side output shaft 23 within the transfer case 20, and is configured to rotate in unison with the second input shaft 22. As shown in FIG. 2, the motor 30 includes a rotor 31, a stator 32, and the rotor shaft 33. The rotor 31 is attached on the rotor shaft 33 and rotates in unison with the rotor shaft 33. The stator 32 includes a stator core and a stator coil wound around the stator core. The second input shaft 22, the sun gear S, and the first rotating member 51 are coupled to the rotor shaft 33 in such a manner as to rotate in unison with the rotor shaft 33.

The engagement device 40 is a device that switches connection states of the rotating members included in the transfer 12. The engagement device 40 functions as an input switch portion, a gear switch portion, and a distribution switch portion. The input switch portion switches between a direct coupling state (first input state) in which the first input shaft 21 is directly coupled to the rear-wheel-side output shaft 23, and a gear state (second input state) in which the first input shaft 21 is coupled to the sun gear S of the planetary gear system 25. The input switch portion is a high-low switch portion and is therefore included in the gear switch portion. The gear switch portion switches between a gear state in which rotation of the first input shaft 21 is transmitted to the rear-wheel-side output shaft 23, with speed of the rotation being changed, and a non-gear state in which the rotation of the first input shaft 21 is transmitted to the rear-wheel-side output shaft 23, without the speed of the rotation being changed. The distribution switch portion switches between a non-distribution state (two-wheel-drive state) in which the motive power input from the first input shaft 21 is transmitted only to the rear wheels 4, and a distribution state (four-wheel-drive state) in which the motive power input from the first input shaft 21 is transmitted in a distributional manner to the front wheels 3 and the rear wheels 4. As shown in FIG. 2, the engagement device 40 includes a first dog clutch 41, a second dog clutch 42, and a third dog clutch 43.

The first dog clutch 41 is an engagement device that functions as the input switch portion and the gear switch portion. The first dog clutch 41 is a device that selectively switches the other end of connection with the first input shaft 21, and selectively couples the first input shaft 21 to the rear-wheel-side output shaft 23 or the sun gear S. In other words, the first dog clutch 41 is the so-called high-low switch portion (gear switch portion), and switches between the direct coupling state in which the rotation of the first input shaft 21 is transmitted to the rear-wheel-side output shaft 23, without the speed of the rotation being changed, and the gear state in which the rotation of the first input shaft 21 is transmitted to the rear-wheel-side output shaft 23, with the speed of the rotation being changed by the planetary gear system 25. In other words, the first dog clutch 41 switches between the first input state (direct coupling state) in which the motive power from the engine 2 is transmitted to the rear-wheel-side output shaft 23 without the planetary gear system 25 involved, and the second input state (gear state) in which the motive power from the engine 2 is transmitted to the rear-wheel-side output shaft 23 via the planetary gear system 25.

Moreover, the first dog clutch 41 includes a first switch sleeve 44. The first switch sleeve 44 includes first gear teeth 44a that mesh with gear teeth 21a of the first input shaft 21, and second gear teeth 44b that mesh with first gear teeth 23a of the rear-wheel-side output shaft 23 or the input gear teeth 51a of the first rotating member 51. The first switch sleeve 44 is moved in the axial direction by an actuator for the first dog clutch 41.

In a state where the first gear teeth 44a always mesh with the first input shaft 21, the first switch sleeve 44 switches such that the second gear teeth 44b mesh with any one of the rear-wheel-side output shaft 23 and the first rotating member 51. When the second gear teeth 44b mesh with the first gear teeth 23a of the rear-wheel-side output shaft 23, the first dog clutch 41 is in the direct coupling state (first input state). When the second gear teeth 44b mesh with the input gear teeth 51a of the first rotating member 51, the first dog clutch 41 is in the gear state (second input state).

The second dog clutch 42 is an engagement device that functions as the gear switch portion. The second dog clutch 42 is a device that selectively switches the other end of connection with the ring gear R, and selectively fixes the ring gear R to a fixed member 20a. In other words, the second dog clutch 42 is a fixation switch portion. The fixed member 20a is the transfer case 20 or a non-rotating member integrated with the transfer case 20. The second dog clutch 42 switches between an engagement state (fixed state) in which the ring gear R is mechanically fixed, and a release state (non-fixed state) in which the ring gear R is rotatably released.

The second dog clutch 42 includes a second switch sleeve 45. The second switch sleeve 45 includes gear teeth 45a that mesh with the first output gear teeth 53a of the third rotating member 53 and the fixed member 20a. The second switch sleeve 45 is moved in the axial direction by an actuator for the second dog clutch 42.

In a state where the gear teeth 45a always mesh with the fixed member 20a, the second switch sleeve 45 switches between a state of meshing with the third rotating member 53 and a state of not meshing with the third rotating member 53. In other words, the second switch sleeve 45 switches between the engagement state (fixed state) of meshing with the first output gear teeth 53a of the third rotating member 53, and the release state (non-fixed state) of not meshing with the first output gear teeth 53a of the third rotating member 53. In other words, the second switch sleeve 45 switches between the fixed state in which the ring gear R is coupled to the fixed member 20a, and the non-fixed state in which the ring gear R is rotatably released.

The third dog clutch 43 is an engagement device that functions as the distribution switch portion and the gear switch portion. The third dog clutch 43 is a device that switches connection relationships among the rear-wheel-side output shaft 23, the carrier C, and the ring gear R. Specifically, the third dog clutch 43, as the distribution switch portion, switches between a distribution state in which part of the motive power to be transmitted to the rear-wheel-side output shaft 23 is distributed to the front-wheel-side output shaft 24, and a non-distribution state in which the motive power to be transmitted to the rear-wheel-side output shaft 23 is not distributed to the front-wheel-side output shaft 24. Moreover, the third dog clutch 43, as the gear switch portion, switches between a differential state (motive power split mode) in which differential movement of the planetary gear system 25 is allowed, and a non-differential state (lock mode) in which the differential movement of the planetary gear system 25 is restricted. In other words, the third dog clutch 43 is an engagement device that selectively couples two of the three rotating elements included in the planetary gear system 25. The third dog clutch 43 switches between the motive power split mode in which each of the three rotating elements of the planetary gear system 25 can rotate and can make differential movement, and the lock mode in which the three rotating elements are locked to be unable to relatively rotate. As described above, the third dog clutch 43 switches among a first non-distribution state (differential state) in which the rear-wheel-side output shaft 23 is not coupled to the ring gear R or the carrier C, a second non-distribution state (unified state) in which the ring gear R is coupled only to the carrier C, a first distribution state (differential state) in which the rear-wheel-side output shaft 23 is coupled only to the ring gear R, a second distribution state (unified state) in which the rear-wheel-side output shaft 23 is coupled to the ring gear R and the carrier C, and a third distribution state (differential state) in which the rear-wheel-side output shaft 23 is coupled only to the carrier C.

The third dog clutch 43 includes a third switch sleeve 46. The third switch sleeve 46 includes first gear teeth 46a and second gear teeth 46b. Both the first gear teeth 46a and the second gear teeth 46b mesh with the second output gear teeth 52b of the second rotating member 52, the second output gear teeth 53b of the third rotating member 53, and second gear teeth 23b of the rear-wheel-side output shaft 23. The third switch sleeve 46 is moved in the axial direction by an actuator for the third dog clutch 43.

The third switch sleeve 46 switches among the first non-distribution state (differential state) of meshing only with the rear-wheel-side output shaft 23, the second non-distribution state (unified state) of meshing with the third rotating member 53 and the second rotating member 52 without meshing with the rear-wheel-side output shaft 23, the first distribution state (differential state) of meshing with the rear-wheel-side output shaft 23 and the third rotating member 53 without meshing with the second rotating member 52, the second distribution state (unified state) of meshing with the rear-wheel-side output shaft 23, the third rotating member 53, and the second rotating member 52, and the third distribution state (differential state) of meshing with the rear-wheel-side output shaft 23 and the second rotating member 52 without meshing with the third rotating member 53. In other words, the third switch sleeve 46 switches between the differential state (motive power split mode) in which the differential movement of the planetary gear system 25 is allowed, and the non-differential state (mechanical lock mode) in which the differential movement of the planetary gear system 25 is restricted.

As described above, the transfer 12 can switch among a plurality of drive states through the planetary gear system 25 and the engagement device 40. Accordingly, when controlling the drive states of the transfer 12, the electronic control device 100 controls operation of the motor 30, and also controls a state of the planetary gear system 25 by controlling a state of the engagement device 40. Command signals for controlling the transfer 12 includes a command signal for controlling the motor 30, and a command signal for controlling the engagement device 40. The electronic control device 100 controls operation of the engagement device 40 by outputting a command signal to an actuator that causes the engagement device 40 to operate. The electronic control device 100 executes switch control of the engagement device 40, whereby the state of the planetary gear system 25 can be switched among a first mode (motive power split mode), a second mode (lock mode), and a third mode (gear mode).

The first mode is a state (differential state) in which each of the three rotating elements included in the planetary gear system 25 can make differential movement. The first mode is the motive power split mode. As shown in FIG. 2, the motive power split mode is a mode in which each of the sun gear S, the carrier C, and the ring gear R can relatively rotate. In other words, regardless of the state of the first dog clutch 41, the motive power split mode can be set by using the second dog clutch 42 and the third dog clutch 43. Accordingly, the motive power split mode includes a state (differential state) in which the three rotating elements included in the planetary gear system 25 can make differential movement in states of being coupled to the motor 30, the rear-wheel-side output shaft 23, and the front-wheel-side output shaft 24. Note that the motive power split mode is synonymous with the differential state.

Figure 3:
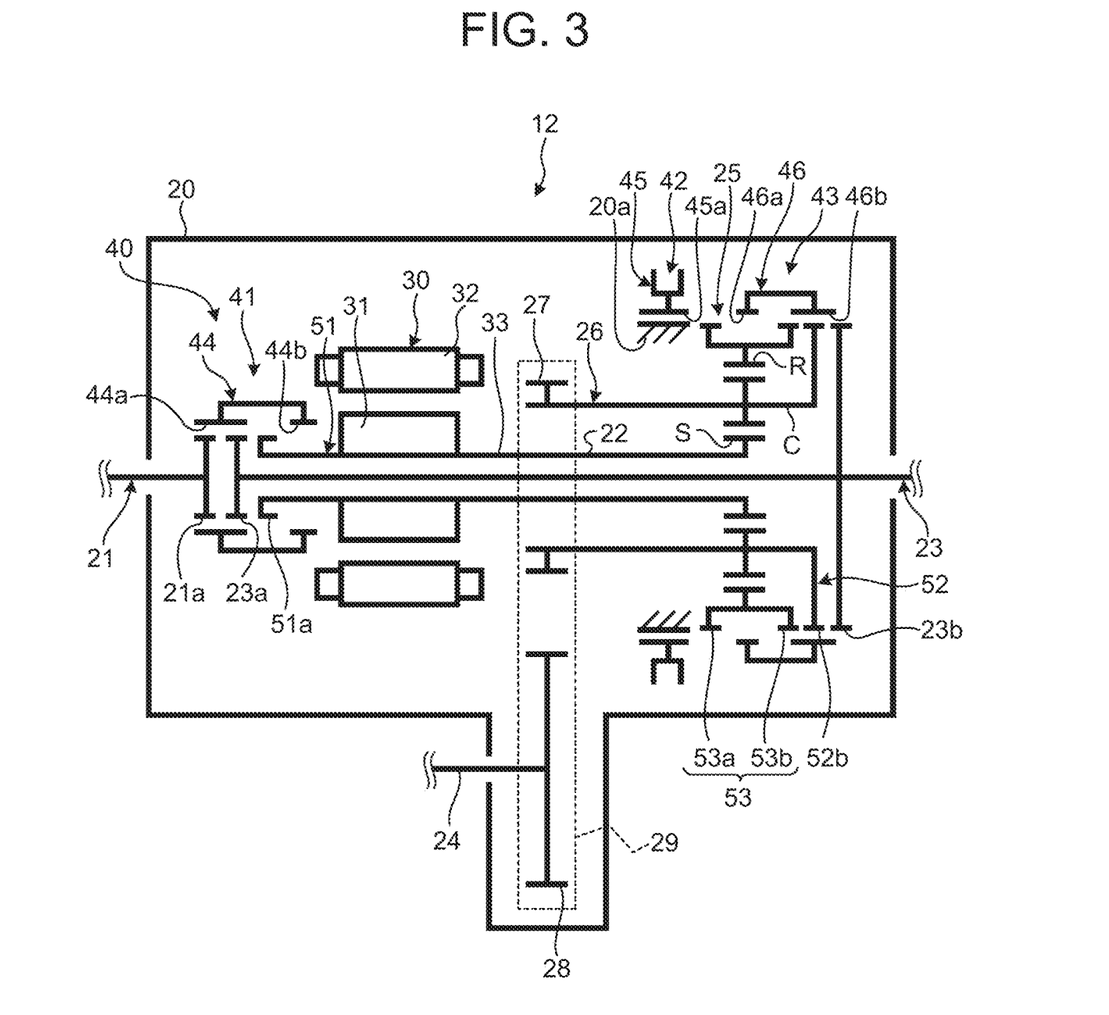
FIG. 3 is a skeleton diagram for describing the transfer in a lock mode.

The second mode is a state (unified state) in which two rotating elements of the three rotating elements included in the planetary gear system 25 are coupled to each other. The second mode is the lock mode. As shown in FIG. 3, the lock mode is a mode in which the three rotating elements in the planetary gear system 25 are locked through mechanical connection to be unable to relatively rotate. Note that the lock mode is synonymous with the unified state or the non-differential state.

The third mode is a state in which any one rotating element of the three rotating elements included in the planetary gear system 25 is fixed to the fixed member 20a, and the other two rotating elements can rotate. The third mode is the gear mode. The gear mode is a mode in which the three rotating elements in the planetary gear system 25 function as an input element, an output element, and a reaction element, respectively. The reaction element is mechanically fixed.

In the vehicle 1, the motive power from the power source is transmitted to the front wheels 3 and the rear wheels 4 via the planetary gear system 25, in the four-wheel-drive state in which both the front wheels 3 and the rear wheels 4 are driven. At the time, the planetary gear system 25 can switch between the differential state (motive power split mode) and the unified state (lock mode). In other words, in the four-wheel-drive state, the transfer 12 can switch between the differential state in which rotational differential movement between the rear propeller shaft 14 and the front propeller shaft 13 is not restricted, and the non-differential state in which the rotational differential movement between the rear propeller shaft 14 and the front propeller shaft 13 is restricted, by switching states of the planetary gear system 25 through the engagement device 40. In other words, in the four-wheel-drive state, the transfer 12 can be set in a first drive state (torque split 4WD mode) in which the rear-wheel-side output shaft 23 and the transmission portion 26 can make differential movement, and in a second drive state (fixed distribution 4WD mode) in which the rear-wheel-side output shaft 23 and the transmission portion 26 are in a non-differential state.

The first drive state is a four-wheel-drive state in which motive power is transmitted to the front wheels 3 and the rear wheels 4, in a case where the first dog clutch 41 is in the first input state, the second dog clutch 42 is in the release state, the third dog clutch 43 is in the first distribution state (differential state), and the planetary gear system 25 is in the motive power split mode (differential state). In the first drive state, front-rear distribution control can be performed by using torque output from the motor 30. The first drive state is the so-called torque split 4WD mode. The torque split mode is intended to cause the front wheels 3 to generate driving force from the motive power (motor torque) output from the motor 30, and to change distribution of the motive power to be transmitted to the transmission portion 26 and the rear-wheel-side output shaft 23.

When the transfer 12 is in the first drive state, the planetary gear system 25 is in the motive power split mode. Accordingly, the motive power transmitted from the engine 2 to the first input shaft 21 is transmitted to the rear-wheel-side output shaft 23, and the motive power transmitted from the motor 30 to the second input shaft 22 is transmitted to the front-wheel-side output shaft 24 via the planetary gear system 25. At the time, the distribution of the motive power transmitted to the front-wheel side and the rear-wheel side can be controlled by using the motive power (motor torque) output from the motor 30. Accordingly, in the torque split 4WD mode, a motive power distribution ratio between the front wheels 3 and the rear wheels 4 is determined by operation of the motor 30. The motive power distribution ratio is four-wheel-drive performance.

The second drive state is a four-wheel-drive state in which motive power is transmitted to the front wheels 3 and the rear wheels 4, in a case where the first dog clutch 41 is in the first input state, the second dog clutch 42 is in the release state, the third dog clutch 43 is in the second distribution state (unified state), and the planetary gear system 25 is in the lock mode (unified state). The second drive state is the so-called fixed distribution 4WD mode. The fixed distribution 4WD mode is a mode in which distribution of the motive power transmitted to the rear-wheel-side output shaft 23 and the front-wheel-side output shaft 24 is mechanically fixed.

When the transfer 12 is in the second drive state, the planetary gear system 25 is in the lock mode. Accordingly, when the motive power from the engine 2 is split into the rear-wheel-side output shaft 23 and the front-wheel-side output shaft 24, differential action of the planetary gear system 25 is restricted by the third dog clutch 43, and the three rotating elements therefore make the same number of rotations. Accordingly, in the fixed distribution 4WD mode, a motive power distribution ratio between the front wheels 3 and the rear wheels 4 is determined by mechanical connection. In other words, the motive power distribution ratio is fixed.

As described above, in the first drive state, operation (output torque) of the motor 30 is determined in order to determine the motive power distribution ratio. In contrast, in the second drive state, operation (output torque) of the motor 30 can be determined independently of the motive power distribution ratio. Accordingly, when the transfer 12 is in the second drive state, the electronic control device 100 can adjust output of the motor 30 without affecting the motive power distribution ratio.

In the first drive state, when temperature of the motor 30 becomes high, torque transmitted to the front-wheel-side output shaft 24 may become insufficient. In other words, driving force generated by the front wheels 3 may become insufficient. In such a case, it is feared that the four-wheel-drive state cannot be maintained due to deterioration in 4WD performance caused by the insufficient driving force of the front wheels 3. Accordingly, in the first drive state, a countermeasure against a rise in the temperature of the motor 30 is needed.

Accordingly, the electronic control device 100 is configured such that driving force of the drive wheels does not become insufficient, by controlling the transfer 12 based on the temperature of the motor 30. When the temperature of the motor 30 becomes high during the motive power split mode, the electronic control device 100 executes control of selecting an operation mode of the vehicle 1, depending on a traveling state of the vehicle 1.

When an operation mode of the vehicle 1 is selected, the determination section 101 determines, based on a signal from a temperature sensor that senses a temperature of the motor 30, whether or not the motor temperature is high. When it is determined by the determination section 101 that the motor temperature is high, the control section 102 performs control of switching the operation mode of the vehicle 1 to a desired state. For example, the control section 102 can perform motor control of controlling output of the motor 30, and engagement control of controlling connection of the engagement device 40.

Figure 4:
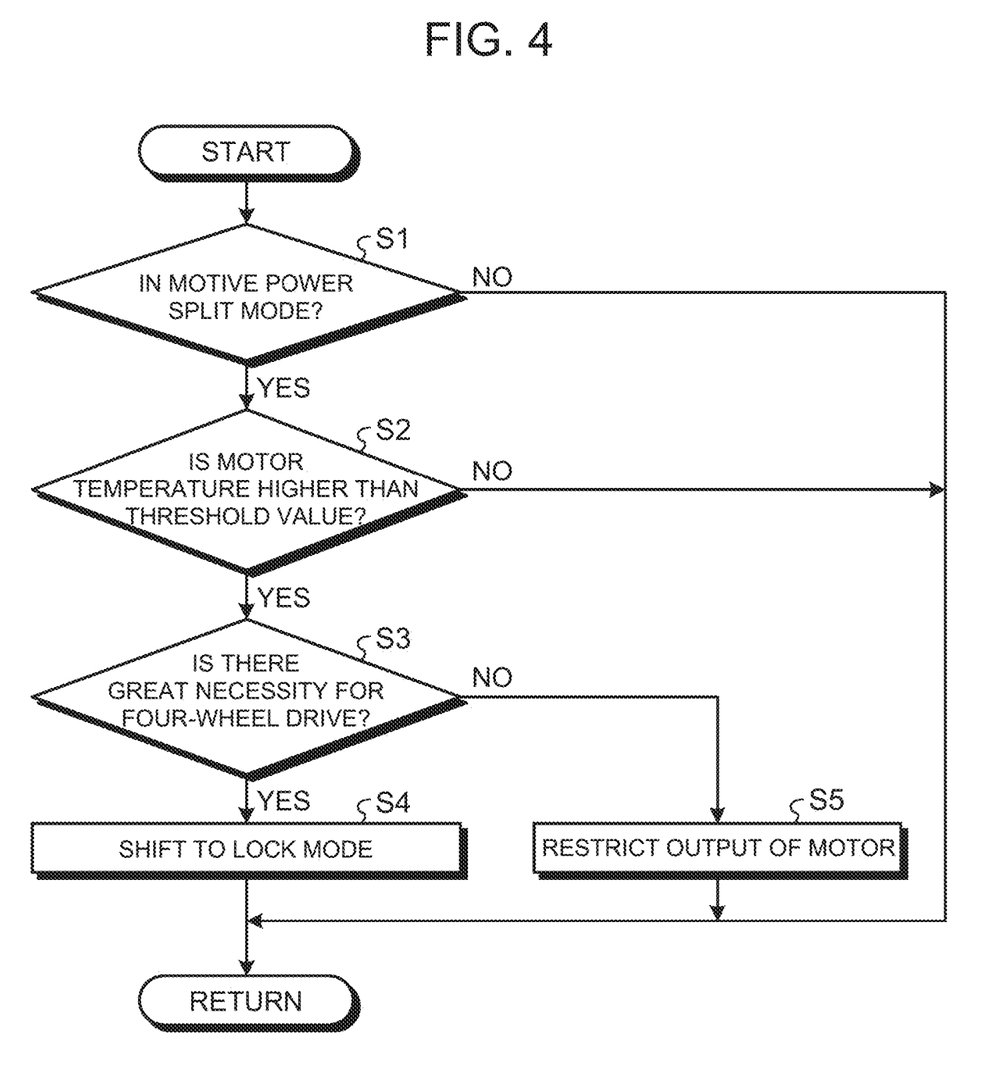
FIG. 4 is a flowchart showing control of selecting an operation mode of the vehicle.

FIG. 4 is a flowchart showing control of selecting an operation mode of the vehicle. Note that the control shown in FIG. 4 is performed by the electronic control device 100 repeatedly.

The electronic control device 100 determines whether or not the planetary gear system 25 is in the motive power split mode (step S1). In step S1, it is determined by the determination section 101 whether or not the planetary gear system 25 is in the differential state. In other words, it is determined by the determination section 101 whether or not the third dog clutch 43 is in the first distribution state (differential state).

When the planetary gear system 25 is not in the motive power split mode (step S1: No), the current control routine is terminated.

When the planetary gear system 25 is in the motive power split mode (step S1: Yes), the electronic control device 100 determines whether or not the temperature of the motor 30 is higher than a threshold value (step S2). In step S2, it is determined by the determination section 101 whether or not a motor temperature sensed by the temperature sensor is higher than the threshold value. The threshold value is a preset value and is set, for example, to a temperature at which the performance of the motor 30 does not deteriorate. Since the motor temperature does not rise in a state where the motor 30 does not run, it is determined whether or not the motor 30 runs, in the determination processing using the motor temperature in step S2.

When the temperature of the motor 30 is not higher than the threshold value (step S2: No), the current control routine is terminated.

When the temperature of the motor 30 is higher than the threshold value (step S2: Yes), the electronic control device 100 determines whether or not there is great necessity for four-wheel drive (4WD) (step S3). In step S3, it is determined by the determination section 101 whether or not both the front wheels 3 and the rear wheels 4 need to be driven. At the time, the determination section 101 can determine the necessity for four-wheel drive, based on required driving force, vehicle speed, gradient of a traveled road, a selected state of the 4WD selection switch, or the like.

For example, the electronic control device 100 detects a vehicle speed based on a signal from the vehicle speed sensor, and detects an accelerator operation amount based on a signal from the accelerator operation amount sensor. Moreover, the electronic control device 100 calculates required driving force based on the vehicle speed and the accelerator operation amount. In step S3, the determination section 101 determines whether or not the calculated required driving force is larger than a predetermined value. When the required driving force is larger than the predetermined value, it is determined that four-wheel drive is needed.

In step S3, the determination section 101 determines whether or not the vehicle speed is lower than a predetermined vehicle speed. Among cases in which the vehicle speed is lower, there are cases in which four-wheel drive is needed, such as when the vehicle is traveling on a rough road, when the vehicle is performing towing, and when the vehicle is climbing a hill. When the vehicle speed is lower than the predetermined vehicle speed, it is determined that four-wheel drive is needed.

The electronic control device 100 detects a rotation speed of the front wheels 3 (front-wheel speed) and a rotation speed of the rear wheels 4 (rear-wheel speed), based on signals from wheel speed sensors. The electronic control device 100 calculates a differential rotation speed that is obtained by subtracting the front-wheel speed from the rear-wheel speed. When the differential rotation speed is larger than a predetermined value, the determination section 101 determines that slippage of the rear wheels 4 occurs. Accordingly, in step S3, the determination section 101 determines whether or not slippage of the rear wheels 4 occurs. When slippage of the rear wheels 4 occurs, it is determined that four-wheel drive is needed. Not only based on the signals from the wheel speed sensors, a situation in which slippage of wheels occurs can also be detected based on input information from a camera (on-board camera) capturing the wheels or a vibration sensor. The electronic control device 100 can determine whether or not a road is rough, based on a signal from the on-board camera or the vibration sensor, and can determine whether or not slippage of each wheel occurs with high frequency, based on the signal from the on-board camera. In other words, the processing of determining a traveling state in step S3 can be executed based on "multi-terrain select" or the like.

The electronic control device 100 detects a gradient of a traveled road (road surface gradient), based on a signal from the gradient sensor. In step S3, the determination section 101 determines, based on the detected gradient, whether or not the road surface gradient (up-gradient) during hill climbing is larger than a predetermined value. When the road surface gradient of the hill is larger than the predetermined value, it is determined that four-wheel drive is needed.

The electronic control device 100 detects a selective operation made by a driver on the 4WD selection switch. In step S3, the determination section 101 determines whether or not an operation of switching to the four-wheel-drive state is received through the 4WD selection switch. When the operation on the switch is the operation of switching to four-wheel drive, it is determined that four-wheel drive is needed. In other words, when a 4WD mode (including an off-road mode and a bad weather mode) is selected in the selected state of drive mode, it is determined that four-wheel drive is needed.

When it is determined that there is great necessity for four-wheel drive (step S3: Yes), the electronic control device 100 shifts the state of the planetary gear system 25 from the motive power split mode to the lock mode (step S4). In step S4, through control by the control section 102, the third dog clutch 43 is switched from the first distribution state (differential state) to the second distribution state (unified state). Thus, the planetary gear system 25 shifts from the motive power split mode (differential state) to the lock mode (unified state). After the processing in step S4 is executed, the current control routine is terminated.

When it is determined that there is not great necessity for four-wheel drive (step S3: No), the electronic control device 100 restricts output of the motor 30 (step S5). In step S5, through control by the control section 102, output of the motor 30 is restricted while the motive power split mode is maintained. For example, a motor torque after the restriction is imposed in step S5 is made smaller than a motor torque output from the motor 30 when affirmative determination is made in step S2. The operation (output torque) of the motor 30 is adjusted by the control section 102 as described above. After the processing in step S5 is executed, the current control routine is terminated.

As described hereinabove, according to the embodiment, in a traveling state in which the vehicle 1 needs four-wheel drive, required driving force can be generated by both the front wheels 3 and the rear wheels 4. Thus, adjustment of a load on a power source (determination as to whether or not the motor 30 is used) can be made while four-wheel-drive performance is maintained, by performing determination to switch to the lock mode. Accordingly, the four-wheel-drive state can be maintained while output of the motor 30 is reduced.

As a modification example of the above-described embodiment, a configuration can be made such that an advance warning is given to a driver when the operation mode of the vehicle 1 is automatically switched by the electronic control device 100. A control flow in the modification example is illustrated in FIG. 5.

Figure 5:
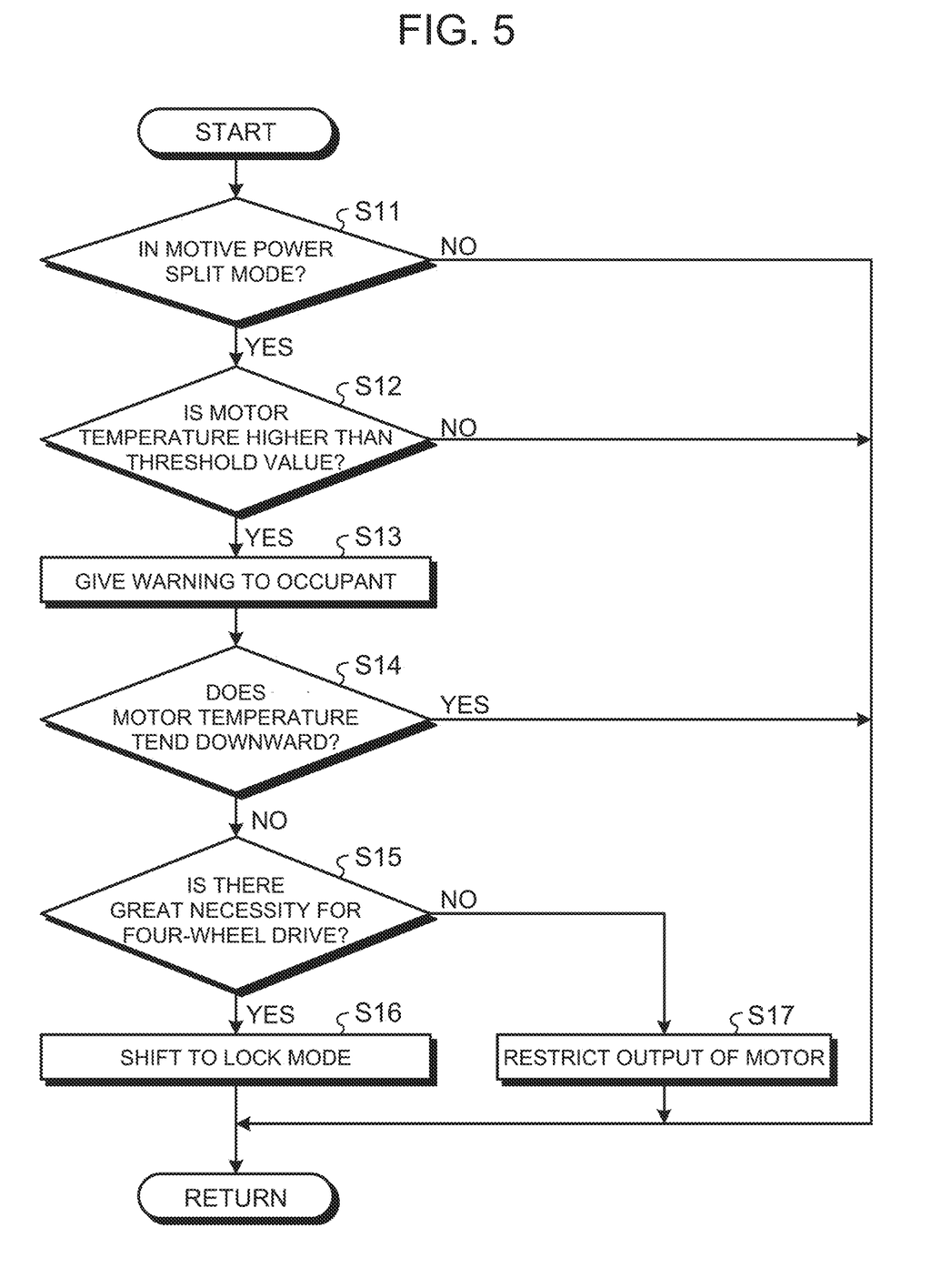
FIG. 5 is a flowchart showing a control flow in a modification example.

FIG. 5 is a flowchart showing the control flow in the modification example. Note that since steps S11 to S12 and S15 to S17 shown in FIG. 5 are processing similar to steps S1 to S5 shown in FIG. 4, a description thereof will be omitted.

As shown in FIG. 5, when the temperature of the motor 30 is higher than the threshold value (step S12: Yes), the electronic control device 100 gives a warning to an occupant of the vehicle 1 (step S13). In step S13, the warning to prompt a driver of the vehicle 1 to shift the driving state is given.

In step S13, the warning (announcement of information) is rendered by displaying information on a display, outputting voice from a speaker, or the like. For example, a message such as "Motor temperature is rising" or "Please switch to the lock mode" is displayed on the display included in a car navigation system, or is output with voice from the speaker.

Then, the electronic control device 100 determines whether or not the temperature of the motor 30 tends downward (step S14). In step S14, it is determined, based on a signal input from the temperature sensor, whether or not the temperature tends downward in comparison with the motor temperature sensed when the warning is rendered in step S13. At the time, the determination section 101 can determine whether or not the motor temperature tends downward, by comparing the motor temperature with the threshold value used in step S12.

When the temperature of the motor 30 tends downward (step S14: Yes), the current control routine is terminated.

When the temperature of the motor 30 does not tend downward (step S14: No), the current control routine advances to step S15. Step S15 is processing similar to step S3 shown in FIG. 4.

As described above, according to the modification example, frequency of mode shifts can be reduced while a rise in the temperature of the motor 30 is restrained.

Moreover, the engagement device included in the transfer 12 may include a function of switching the state of the planetary gear system 25 at least between the differential state (motive power split mode) and the unified state (lock mode). In other words, the configuration of the engagement device 40 is not limited to the above-described embodiment.

The transfer 12 can switch among a plurality of drive states, apart from between the first drive state and the second drive state.

Further, the vehicle 1 is not limited to a four-wheel-drive vehicle based on a front-engine, rear-wheel-drive layout, but may be a four-wheel-drive vehicle based on a front-engine, front-wheel-drive layout. In other words, as a modification example of the vehicle 1, the front wheels 3 may be the "first drive wheel", the rear wheels 4 may be the "second drive wheel", the front-wheel-side output shaft 24 may be the "first output shaft", and the rear-wheel-side output shaft 23 may be the "second output shaft".

The motor 30 is not limited to the configuration in which the motor 30 is arranged on the same axis as the first input shaft 21 and the rear-wheel-side output shaft 23, and the motor 30 may be arranged on a different axis from the axis of the first input shaft 21 and rear-wheel-side output shaft 23. Further, the motive power output from the motor 30 may be transmitted to the second input shaft 22 via a reduction gear train in which a plurality of gears mash with each other.

In addition, the motor 30 is configured by using a rotating electric machine (motor-generator), and therefore can generate electricity by using the motive power from the engine 2. The electricity generated by the motor 30 is stored in the battery. Further, the first power source is not limited to an engine, and may be a rotating electric machine.

What is claimed is:
1. A vehicle comprising a transmission system,
the transmission system including:
a first input shaft to which motive power from a first power source is input;
a second input shaft to which motive power from a second power source is input;
a first output shaft that outputs the motive power to a first drive wheel;
a second output shaft that outputs the motive power to a second drive wheel;
a differential gear including, as three rotating elements,
a first rotating element to which the second input shaft is coupled,
a second rotating element to which the second output shaft is coupled, and
a third rotating element to which the first output shaft is coupled; and
an engagement device that selectively couples any two rotating elements of the three rotating elements, and
the transmission system being capable of switching between a first mode in which the engagement device is released and the three rotating elements can make differential movement, and a second mode in which the engagement device is engaged and the three rotating elements are mechanically unified, wherein when temperature of the second power source becomes higher than a threshold value during the first mode and when both the first drive wheel and the second drive wheel need to be driven, switching is performed from the first mode to the second mode, and when the first drive wheel and the second drive wheel do not both need to be driven even when the temperature of the second power source becomes higher than the threshold value during the first mode, output of the second power source is restricted, while the first mode is maintained.

2. The vehicle according to claim 1, wherein when required driving force is larger than a predetermined value, it is determined that both the first drive wheel and the second drive wheel need to be driven, and when the required driving force is equal to or smaller than the predetermined value, it is determined that the first drive wheel and the second drive wheel do not both need to be driven.

3. The vehicle according to claim 1, wherein when vehicle speed is lower than a predetermined vehicle speed, it is determined that both the first drive wheel and the second drive wheel need to be driven, and when the vehicle speed is equal to or higher than the predetermined vehicle speed, it is determined that the first drive wheel and the second drive wheel do not both need to be driven.

4. The vehicle according to claim 1, wherein when a road surface gradient during hill climbing is larger than a predetermined value, it is determined that both the first drive wheel and the second drive wheel need to be driven, and when the road surface gradient is equal to or smaller than the predetermined value, it is determined that the first drive wheel and the second drive wheel do not both need to be driven.

5. The vehicle according to claim 1, wherein when slippage of the first drive wheel occurs, it is determined that both the first drive wheel and the second drive wheel need to be driven, and when no slippage of the first drive wheel occurs, it is determined that the first drive wheel and the second drive wheel do not both need to be driven.

6. The vehicle according to claim 1, wherein when a switch for switching to a drive mode in which both the first drive wheel and the second drive wheel are driven is operated by a driver, it is determined that both the first drive wheel and the second drive wheel need to be driven, and when the switch is not operated, it is determined that the first drive wheel and the second drive wheel do not both need to be driven.

7. The vehicle according to claim 1, wherein when the temperature of the second power source becomes higher than the threshold value during the first mode, a warning is given to prompt a driver to lower the temperature of the second power source, and when the temperature of the second power source does not tend downward after the warning is given, it is determined whether or not both the first drive wheel and the second drive wheel need to be driven.

8. A control device for a vehicle equipped with a transmission system,
the transmission system including:
a first input shaft to which motive power from a first power source is input;
a second input shaft to which motive power from a second power source is input;
a first output shaft that outputs the motive power to a first drive wheel;
a second output shaft that outputs the motive power to a second drive wheel;
a differential gear including, as three rotating elements,
a first rotating element to which the second input shaft is coupled,
a second rotating element to which the second output shaft is coupled, and
a third rotating element to which the first output shaft is coupled; and
an engagement device that selectively couples any two rotating elements of the three rotating elements, and
the transmission system being capable of switching between a first mode in which the engagement device is released and the three rotating elements can make differential movement, and a second mode in which the engagement device is engaged and the three rotating elements are mechanically unified,
the control device comprising a control section that switches a state of the differential gear from the first mode to the second mode when temperature of the second power source becomes higher than a threshold value during the first mode and when both the first drive wheel and the second drive wheel need to be driven,
wherein when the first drive wheel and the second drive wheel do not both need to be driven even when the temperature of the second power source becomes higher than the threshold value during the first mode, the control section restricts output of the second power source, while maintaining the first mode.

9. The control device for the vehicle according to claim 8, further comprising a determination section that determines whether or not both the first drive wheel and the second drive wheel need to be driven.

10. The control device for the vehicle according to claim 9, wherein the determination section determines that both the first drive wheel and the second drive wheel need to be driven when required driving force is larger than a predetermined value, and determines that the first drive wheel and the second drive wheel do not both need to be driven when the required driving force is equal to or smaller than the predetermined value.

11. The control device for the vehicle according to claim 9, wherein the determination section determines that both the first drive wheel and the second drive wheel need to be driven when vehicle speed is lower than a predetermined vehicle speed, and determines that the first drive wheel and the second drive wheel do not both need to be driven when the vehicle speed is equal to or higher than the predetermined vehicle speed.

12. The control device for the vehicle according to claim 9, wherein the determination section determines that both the first drive wheel and the second drive wheel need to be driven when a road surface gradient during hill climbing is larger than a predetermined value, and determines that the first drive wheel and the second drive wheel do not both need to be driven when the road surface gradient is equal to or smaller than the predetermined value.

13. The control device for the vehicle according to claim 9, wherein the determination section determines that both the first drive wheel and the second drive wheel need to be driven when slippage of the first drive wheel occurs, and determines that the first drive wheel and the second drive wheel do not both need to be driven when no slippage of the first drive wheel occurs.

14. The control device for the vehicle according to claim 9, wherein the determination section determines that both the first drive wheel and the second drive wheel need to be driven when a switch for switching to a drive mode in which both the first drive wheel and the second drive wheel are driven is operated by a driver, and determines that the first drive wheel and the second drive wheel do not both need to be driven when the switch is not operated.

15. The control device for the vehicle according to claim 9, wherein when the temperature of the second power source becomes higher than the threshold value during the first mode, the control section gives a warning to prompt a driver to lower the temperature of the second power source, and when the temperature of the second power source does not tend downward after the warning is given, the determination section determines whether or not both the first drive wheel and the second drive wheel need to be driven.

\* \* \* \* \*